United States Patent
Peng et al.

(10) Patent No.: US 7,467,877 B2
(45) Date of Patent: Dec. 23, 2008

(54) LIGHT SOURCE

(75) Inventors: Chung Peng, Tai-Chung (TW);
Chih-Kuang Chen, Kao-Hsiung (TW);
Shin-Chin Tseng, Tai-Chung (TW);
Yu-Kai Lin, Hsinchu (TW); Shen-Hong Chou, Miaoli County (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 334 days.

(21) Appl. No.: 11/532,110

(22) Filed: Sep. 15, 2006

(65) Prior Publication Data
US 2007/0291485 A1 Dec. 20, 2007

(30) Foreign Application Priority Data
Jun. 16, 2006 (TW) ................ 95121581 A (51) Int. Cl.
*F21S 13/14* (2006.01)
(52) U.S. Cl. .................. 362/252; 362/97; 362/231
(58) Field of Classification Search ........... 362/231, 362/97, 249, 252
See application file for complete search history.

(56) References Cited

U.S. PATENT DOCUMENTS

| | | | | |
|---|---|---|---|---|
| 6,144,352 A * | 11/2000 | Matsuda et al. | ................ | 345/83 |
| 6,307,527 B1 * | 10/2001 | Youngquist et al. | ........... | 345/39 |
| 6,666,567 B1 * | 12/2003 | Feldman et al. | ............. | 362/237 |
| 7,281,816 B2 * | 10/2007 | Suzuki | ........................ | 362/231 |
| 2005/0169007 A1 * | 8/2005 | Chou | ......................... | 362/555 |
| 2006/0087866 A1 * | 4/2006 | Ng et al. | ..................... | 362/612 |
| 2006/0209538 A1 * | 9/2006 | Chang et al. | ................ | 362/231 |
| 2007/0014098 A1 * | 1/2007 | Park et al. | .................... | 362/29 |

FOREIGN PATENT DOCUMENTS

| | | |
|---|---|---|
| CN | 1558284 A | 12/2004 |
| CN | 1713055 A | 12/2005 |

* cited by examiner

*Primary Examiner*—Ali Alavi
(74) *Attorney, Agent, or Firm*—Winston Hsu (57) ABSTRACT

A light source for a backlight unit is disclosed. The light source includes a plurality of light emitting diode modules arranged in a manner corresponding to an array, in which each of the light emitting diode modules includes a plurality of light emitting diodes. The array includes a plurality of columns and rows. Preferably, the light emitting diodes of the light emitting diode module of any two adjacent columns are arranged in a different manner, and the light emitting diodes of the light emitting diode module of any two adjacent rows are arranged in a different manner.

46 Claims, 6 Drawing Sheets

LIGHT SOURCE

BACKGROUND OF THE INVENTION

1. Field of the Invention

The invention relates to a light emitting diode backlight unit, and more particularly, to an arrangement method of light emitting diodes within the light emitting diode backlight unit.

2. Description of the Prior Art

Liquid crystal displays are commonly utilized in various electronic products including cell phones, PDAs, and notebook computers. As the market demand for large-scale display panels continues to increase, liquid crystal displays having advantages such as small size and light weight have become widely popular. Due to the fact that the liquid crystal display itself does not illuminate, a backlight unit has to be installed under the liquid crystal display to provide an area light source for the liquid crystal display.

Backlight units are commonly divided into two major categories: side-emitting type and direct type. Additionally, the area light source provided for the liquid crystal display is divided into two types: one being arranging a plurality of code cathode fluorescent lamps (CCFL) of external electrode fluorescent lamps in a parallel manner, and the other one being arranging a plurality of dot light source, such as a plurality of light emitting diodes corresponding to a matrix. Since light emitting diodes have the advantage of high color saturation, being mercury-free, having long life expectancy, a low temperature, and have the ability to adjust color temperature through a driving current, they have been commonly utilized in backlight units.

Figure 1:
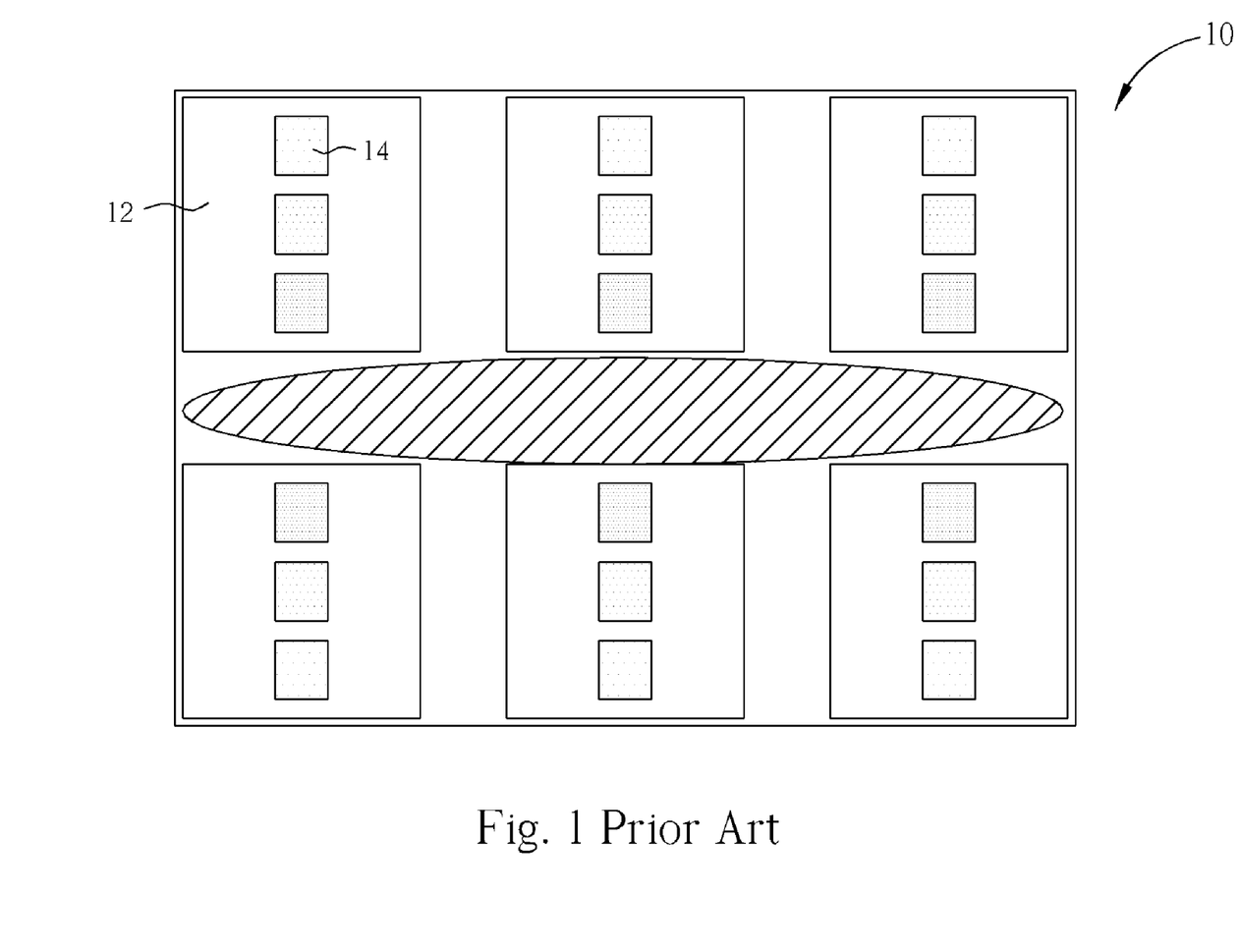
FIG. 1 is a perspective diagram illustrating an arrangement of light emitting diodes of a light emitting diode backlight unit according to the prior art.

Please refer to FIG. 1. FIG. 1 is a perspective diagram illustrating an arrangement of light emitting diodes of a light emitting diode backlight unit 10 according to the prior art. As shown in FIG. 1, the light emitting diode backlight unit 10 includes a plurality of light emitting diode modules 12. Each of the light emitting diode modules 12 includes three light emitting diodes 14 and each of the three being a different color, such as red light emitting diodes, blue light emitting diodes, and green light emitting diodes. Preferably, the light emitting diodes 14 of each light emitting diode module 12 are arranged in a manner of a straight line, and all of the light emitting diodes 14 of the adjacent light emitting diode modules 12 are arranged according to a same direction and the colors of the light emitting diodes 14 of the light emitting diode modules 12 are arranged in a same order.

The conventional arrangement described above however, often results in serious problems. For instance, if the light emitting diodes 14 of the light emitting diode module 12 in the first column and first row are arranged in an order of red, green, and blue, the light emitting diodes 14 of the light emitting diode module 12 in the adjacent first column and second row are also arranged in the same order. Since the color arrangement of the light emitting diodes 14 of the adjacent upper and lower light emitting diode modules 12 is opposite to each other, an uneven color distribution will result in the intersecting region of the two adjacent light emitting diode modules 12, as shown in the figure.

Figure 2:
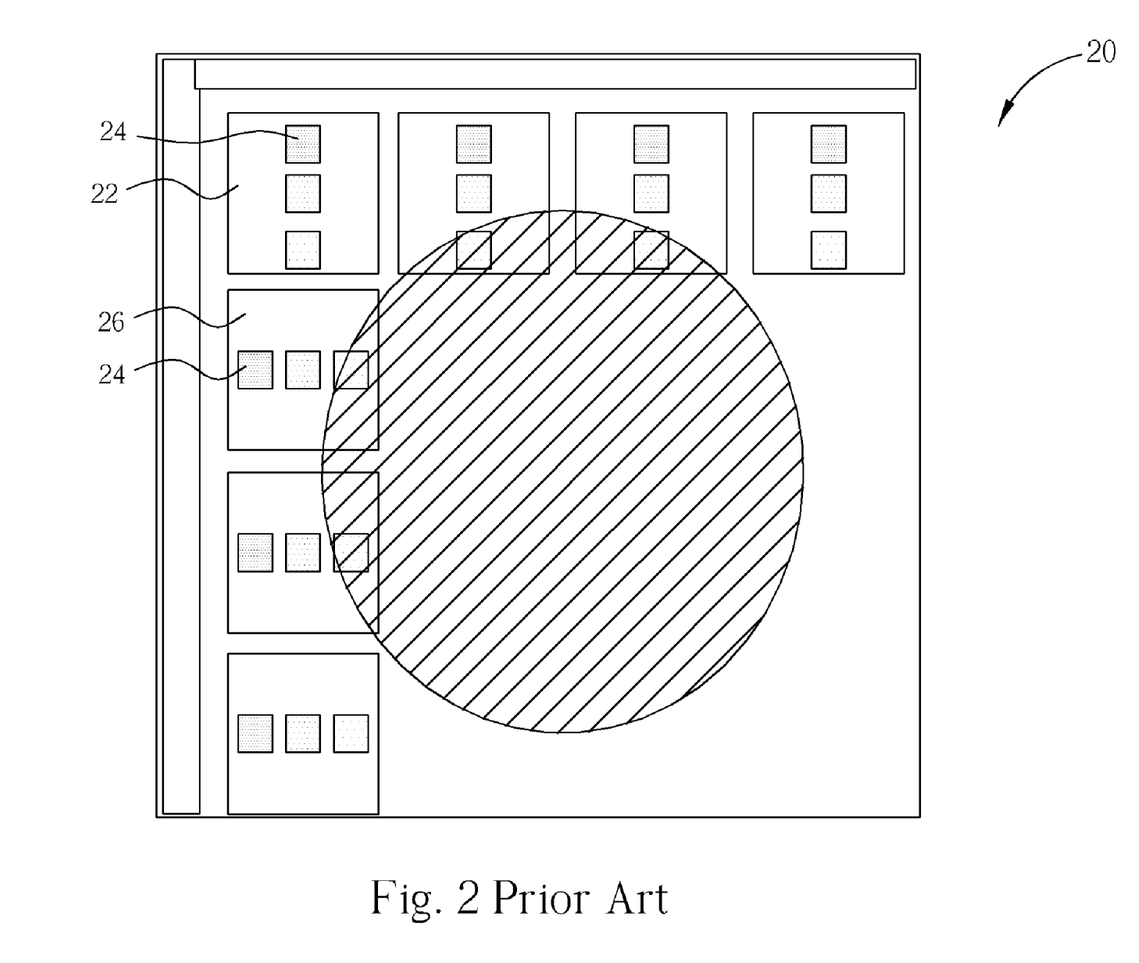
FIG. 2 is a perspective diagram illustrating an arrangement of light emitting diodes of a light emitting diode backlight unit according to the prior art.

Please refer to FIG. 2. FIG. 2 is a perspective diagram illustrating an arrangement of light emitting diodes of a light emitting diode backlight unit 20 according to the prior art. In contrast to the arrangement shown in FIG. 1, the arrangement in this example is commonly found in the side region of the backlight unit. As shown in FIG. 2, the light emitting diode backlight unit 20 includes a plurality of light emitting diode modules 22. Each of the light emitting diode modules 22 includes three light emitting diodes 24 and each of the three being a different color, such as red light emitting diodes, blue light emitting diodes, and green light emitting diodes.

Similar to the problems described previously, since the light emitting diodes 24 of the adjacent light emitting diode modules 22 arranged horizontally in the first row are arranged in a same manner and same color order, and the light emitting diodes 24 of the adjacent light emitting diode modules 26 arranged vertically in the first column are arranged in a same manner and color order, an uneven color distribution will result in the central region of the backlight unit, as indicated by the circle with slanted lines illustrated in FIG. 2.

SUMMARY OF THE INVENTION

It is therefore an objective of the present invention to provide a backlight unit to improve the aforementioned problems of uneven color distribution.

According to the present invention, a light source for a backlight unit is disclosed. The light source includes a plurality of light emitting diode modules arranged in a manner corresponding to an array, in which each light emitting diode module includes a plurality of light emitting diodes. The array includes a plurality of columns and rows, and the light emitting diodes of the light emitting diode module of any two adjacent columns are arranged in a different manner, and the light emitting diodes of the light emitting diode module of any two adjacent rows are arranged in a different manner.

Preferably, the present invention rotates the light emitting diodes of any adjacent row and column of an array toward a clockwise direction or a counterclockwise direction, in which the amount, color, and arrangement of the light emitting diodes can be adjusted according to the design of the product. Please note that rotate is used in the sense of assigning a certain set of characteristics in a rotating fashion. For example, seating assignments rotated by gender, therefore, the seating chart read: male, female, male, female, etc. Rotate as used herein does not mean physical rotation of the light emitting diodes themselves. Thereby, the problem of uneven color distribution commonly found in conventional light emitting diode backlight unit can be significantly improved. Additionally, the light emitting diode modules can be further arranged in an alternating manner. By arranging the light emitting diode modules in an alternating manner, the present invention not only improves the problem of uneven color distribution caused by conventional means of arranging light emitting diode modules according to a same direction and same color order, but also reduces the distance between the center of each light emitting diode module 52 and the center of the plurality of light emitting diode modules 52, thereby increasing the color uniformity of the light emitting diode backlight unit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

Figure 3:
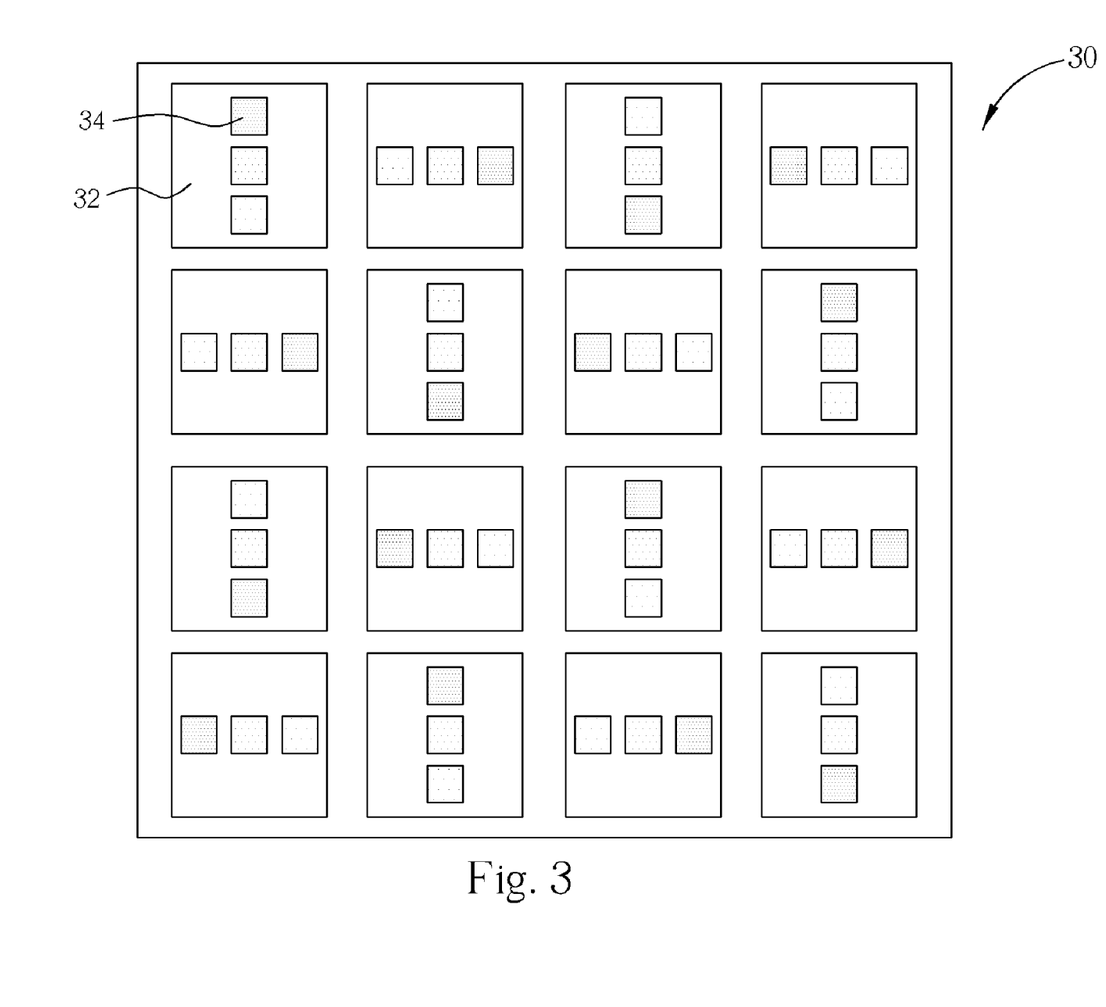
FIG. 3 is a perspective diagram illustrating an arrangement of light emitting diodes of a light emitting diode backlight unit according to a preferred embodiment of the present invention.

Please refer to FIG. 3. FIG. 3 is a perspective diagram illustrating an arrangement of light emitting diodes of a light emitting diode backlight unit according to a preferred embodiment of the present invention. As shown in FIG. 3, the light emitting diode backlight unit 30 includes a plurality of light emitting diode modules 32 arranged in a manner of a 4×4 matrix. Each light emitting diode module 32 includes three light emitting diodes 34, in which the light emitting diodes 34 are selected from the group consisting of red light emitting diodes, blue light emitting diodes, green light emitting diodes, magenta light emitting diodes, orange light emitting diodes, yellow light emitting diodes, and cyan light emitting diodes. According to the preferred embodiment of the present invention, the light emitting diodes 34 are composed of red, blue, and green light emitting diodes arranged in a straight line. Nevertheless, the amount, color, and arrangement of the light emitting diodes can be adjusted according to the demand of the product, and is not limited thereto.

It should be noted that the light emitting diodes 34 of any two adjacent light emitting diode modules 32 are arranged according to a different degree. For instance, if the light emitting diodes 34 in the first column and first row of the 4×4 matrix are arranged according to a straight line, the light emitting diodes 34 in the second column and first row are rotated 90 degrees clockwise relative to the light emitting diodes 34 in the first column and first row. Similarly, the light emitting diodes 34 in the third column and first row are rotated 90 degrees clockwise relative to the light emitting diodes 34 in the second column and first row, and the light emitting diodes 34 in the fourth column and first row are rotated 90 degrees clockwise relative to the light emitting diodes 34 in the third column and first row.

In other words, if the position of the light emitting diodes 34 in the first column and first row is taken as a starting reference point, the light emitting diodes 34 in the second column and first row are rotated 90 degrees clockwise relative to the light emitting diodes 34 in the first column and first row, the light emitting diodes 34 in the third column and first row are rotated 180 degrees clockwise relative to the light emitting diodes 34 in the first column and first row, and the light emitting diodes 34 in the fourth column and first row are rotated 270 degrees clockwise relative to the light emitting diodes 34 in the first column and first row.

Additionally, as shown in the present embodiment, if the first light emitting diode 34, such as a red light emitting diode located in the upper region of the light emitting diode module 32 in the first column and first row is taken as a reference point, such red light emitting diode after rotating 90 degrees clockwise in the second column and first row will be located in the right hand region of the light emitting diode module 32. Moreover, the red light emitting diode after rotating 180 degrees clockwise in the third column and first row will be located in the lower region of the light emitting diode module 32, and the red light emitting diode after rotating 270 degrees clockwise in the fourth column and first row will be located in the left hand region of the light emitting diode module 32.

Similar to the arrangement of the light emitting diodes in the horizontal direction, the light emitting diodes in the vertical direction can also be arranged in a related manner. For instance, if the position of the light emitting diodes 34 in the first column and first row is taken as a starting reference point, the light emitting diodes 34 in the first column and second row are rotated 90 degrees clockwise relative to the light emitting diodes 34 in the first column and first row, the light emitting diodes 34 in the first column and third row are rotated 180 degrees clockwise relative to the light emitting diodes 34 in the first column and first row, and the light emitting diodes 34 in the first column and fourth row are rotated 270 degrees clockwise relative to the light emitting diodes 34 in the first column and first row.

Additionally, if the first light emitting diode 34, such as a red light emitting diode located in the upper region of the light emitting diode module 32 in the first column and first row is taken as a reference point, such red light emitting diode after rotating 90 degrees clockwise in the first column and second row will be located in the right hand region of the light emitting diode module 32. The red light emitting diode after rotating 180 degrees clockwise in the first column and third row will be located in the lower region of the light emitting diode module 32, and the red light emitting diode after rotating 270 degrees clockwise in the first column and fourth row will be located in the left hand region of the light emitting diode module 32.

In the present embodiment, the light emitting diodes of two adjacent light emitting diode modules are rotated toward a clockwise direction, in which the angle of rotation is 90 degrees. However, without limiting the rotation method and rotation angle, the light emitting diodes arranged in the horizontal and vertical direction can also be rotated toward a counterclockwise direction, a clockwise direction, or a combination of both counterclockwise and clockwise direction.

Due to the rotation between the light emitting diodes of the light emitting diode modules, an included angle will be produced between the light emitting diodes of the adjacent light emitting diode modules, and as the angle of rotation changes, a different included angle will be produced. Preferably, the included angle may be an acute angle, a right angle, or an obtuse angle, in which the acute angle includes a range of 15 degrees to 75 degrees, 30 degrees to 60 degrees, and 45 degrees, and the obtuse angle includes a range of 105 degrees to 165 degrees, 120 degrees to 150 degrees, and 135 degrees. By rotating the light emitting diodes of each adjacent light emitting diode module toward different direction, the present invention is able to solve the problem of uneven color distribution found in conventional light emitting diode backlight units, as all of the light emitting diodes of the conventional light emitting diode backlight units are arranged in a same direction.

Figure 4:
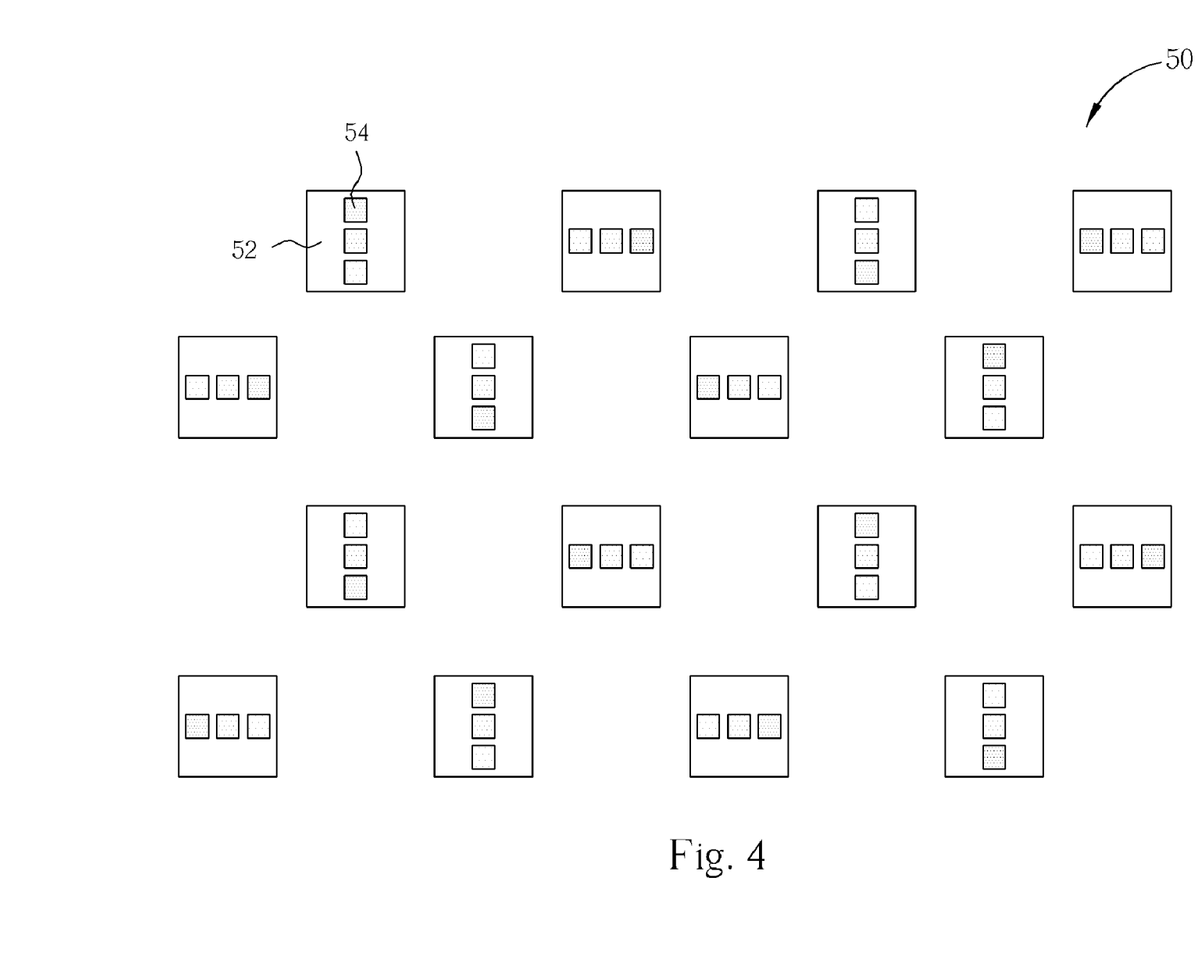
FIG. 4 is a perspective diagram illustrating an arrangement of light emitting diodes of a light emitting diode backlight unit according to an embodiment of the present invention.

Please refer to FIG. 4. FIG. 4 is a perspective diagram illustrating an arrangement of light emitting diodes of a light emitting diode backlight unit according to an embodiment of the present invention. As shown in FIG. 4, the light emitting diode backlight unit 50 includes a plurality of light emitting diode modules 52 arranged in a manner of a 4×4 matrix. Each light emitting diode module 52 includes three light emitting diodes 54, in which the light emitting diodes 54 are selected from the group consisting of red light emitting diodes, blue light emitting diodes, green light emitting diodes, magenta light emitting diodes, orange light emitting diodes, yellow light emitting diodes, and cyan light emitting diodes. According to the preferred embodiment of the present invention, the light emitting diodes 54 are composed of red, blue, and green light emitting diodes arranged in a straight line. Nevertheless, the amount, color, and arrangement of the light emitting diodes can be adjusted according to the demand of the product, and not limited thereto.

In contrast to the previous embodiment, the adjacent light emitting diode modules 52 of the light emitting diode backlight unit 50 are arranged not only according to different directions, but also arranged in an alternate manner. As shown in FIG. 4, the light emitting diode module 52 in the first column and the third column are shifted toward right for approximately a distance of one light emitting diode module 52. Nevertheless, the distance between the light emitting diode modules 52 can be adjust according to the demand of the product, such as equal to, greater than, or smaller than the width of a light emitting diode module 52.

As shown in FIG. 4, the light emitting diodes 54 in the first column and first row of the 4×4 matrix are arranged according to a straight line, and the light emitting diodes 54 in the second column and first row are rotated 90 degrees clockwise relative to the light emitting diodes 54 in the first column and first row. Similarly, the light emitting diodes 54 in the third column and first row are rotated 90 degrees clockwise relative to the light emitting diodes 54 in the second column and first row, and the light emitting diodes 54 in the fourth column and first row are rotated 90 degrees clockwise relative to the light emitting diodes 54 in the third column and first row.

In other words, if the position of the light emitting diodes 54 in the first column and first row is taken as a starting reference point, the light emitting diodes 54 in the second column and first row are rotated 90 degrees clockwise relative to the light emitting diodes 54 in the first column and first row, the light emitting diodes 54 in the third column and first row are rotated 180 degrees clockwise relative to the light emitting diodes 54 in the first column and first row, and the light emitting diodes 54 in the fourth column and first row are rotated 270 degrees clockwise relative to the light emitting diodes 54 in the first column and first row.

Similar to the arrangement of the light emitting diodes in the horizontal direction, light emitting diodes in the vertical direction can also be arranged in a related manner. For instance, if the position of the light emitting diodes 54 in the first column and first row is taken as a starting reference point, the light emitting diodes 54 in the first column and second row are rotated 90 degrees clockwise relative to the light emitting diodes 54 in the first column and first row, the light emitting diodes 54 in the first column and third row are rotated 180 degrees clockwise relative to the light emitting diodes 54 in the first column and first row, and the light emitting diodes 54 in the first column and fourth row are rotated 270 degrees clockwise relative to the light emitting diodes 54 in the first column and first row.

In the present embodiment, the light emitting diodes of two adjacent light emitting diode modules are rotated toward a clockwise direction, in which the angle of rotation is 90 degrees. However, without limiting the rotation method and rotation angle, the light emitting diodes arranged in the horizontal and vertical direction can also be rotated toward a counterclockwise direction, a clockwise direction, or a combination of both counterclockwise and clockwise direction.

Due to the rotation between the light emitting diodes of the light emitting diode modules, an included angle will be produced between the light emitting diodes of the adjacent light emitting diode modules, and as the angle of rotation changes, a different included angle will be produced. Preferably, the included angle may be an acute angle, a right angle, or an obtuse angle, in which the acute angle includes a range of 15 degrees to 75 degrees, 30 degrees to 60 degrees, and 45 degrees, and the obtuse angle includes a range of 105 degrees to 165 degrees, 120 degrees to 150 degrees, and 135 degrees.

It should be noted that by arranging the light emitting diode modules in an alternating manner, the present invention not only improves the problem of uneven color distribution caused by conventional means of arranging light emitting diode modules according to a same direction and same color order, but also reduces the distance between the center of each light emitting diode module 52 and the center of the plurality of light emitting diode modules 52, thereby increasing the color uniformity of the light emitting diode backlight unit.

Figure 5:
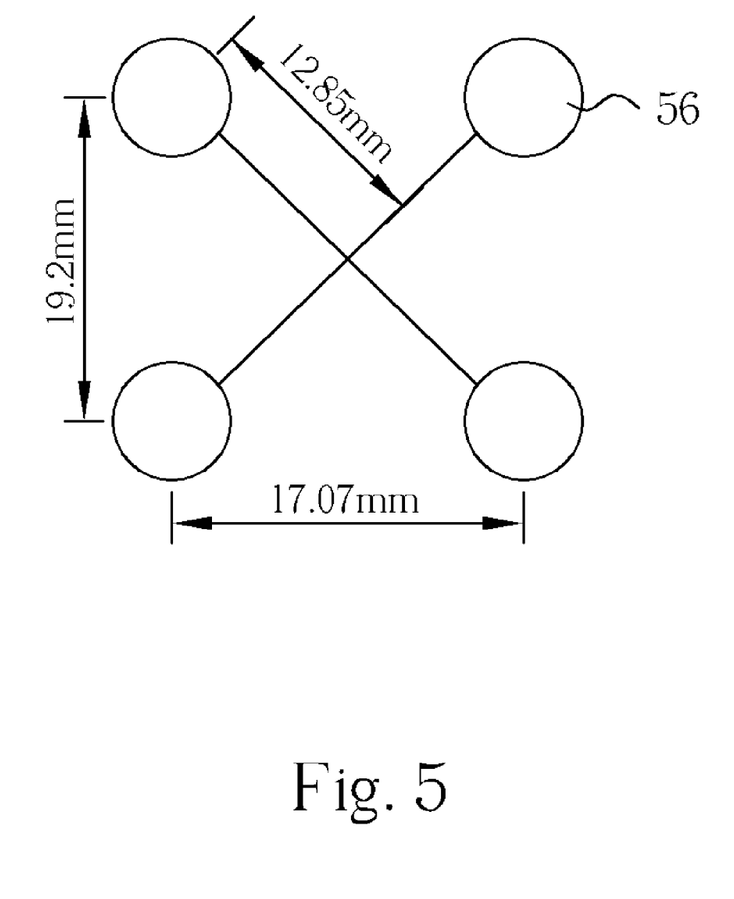
FIG. 5 is a perspective diagram illustrating the dot pitch of light emitting diode modules arranged corresponding to a normal matrix.

Please refer to FIG. 5. FIG. 5 is a perspective diagram illustrating the dot pitch of light emitting diode modules arranged corresponding to a normal matrix. As shown in FIG. 5, when four light emitting diode modules 56 are arranged corresponding to a rectangle, the dot pitch of the x-axis of two adjacent light emitting diode modules 56 is 17.07 mm, and the dot pitch of the y-axis of two adjacent light emitting diode modules 56 is 19.2 mm. In other words, the distance between the center of each light emitting diode module 56 and the center of the four light emitting diode modules 56 is approximately 12.85 mm.

Figure 6:
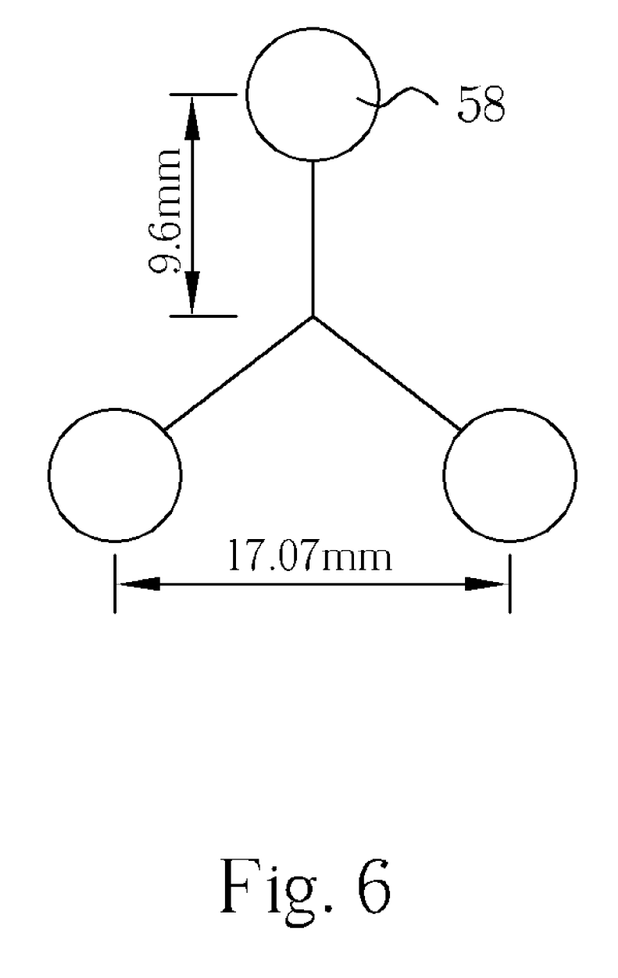
FIG. 6 is a perspective diagram illustrating the dot pitch of light emitting diode modules shown in FIG. 4 arranged in an alternating manner.

Please refer to FIG. 6. FIG. 6 is a perspective diagram illustrating the dot pitch of light emitting diode modules shown in FIG. 4 arranged in an alternating manner. As shown in FIG. 6, the light emitting diode modules 58 are arranged corresponding to a triangle, such as a right triangle or an isosceles triangle. Despite the fact that the dot pitch of two adjacent light emitting diode modules 58 is also 17.07 mm, the distance between the center of the light emitting diode module 58 and the center of the three light emitting diode modules 58 will be decreased to 9.6 mm. In other words, by disposing the light emitting diode modules according to an alternating manner, the present invention is able to significantly reduce the distance between bright spots and dark spots for approximately 25.3%, thereby improving the problem of uneven color distribution found in conventional light emitting diode backlight units. According to another embodiment of the present invention, when three light emitting diode modules 58 are arranged corresponding to a triangle, the light emitting diode modules 58 must include at least one light emitting diode module 58 having light emitting diodes arranged in a direction different from the light emitting diodes of the other two light emitting diode modules 58.

In contrast to the conventional light emitting diode backlight unit of arranging light emitting diodes of a light emitting diode module according to a same direction and arranging the color of the light emitting diodes according to a same order, the present invention rotates the light emitting diodes of any adjacent row and column of an array toward a clockwise direction or a counterclockwise direction, in which the amount, color, and arrangement of the light emitting diodes can be adjusted according to the design of the product. Thereby, the problem of uneven color distribution commonly found in conventional light emitting diode backlight unit can be significantly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light source, for a backlight unit, the light source comprising:
a plurality of light emitting diode modules arranged in a manner corresponding to an array, wherein each light emitting diode module comprises a plurality of light emitting diodes, the array comprises a plurality of columns and rows, and the light emitting diodes of the light emitting diode module of any two adjacent columns are arranged in a different manner, and the light emitting diodes of the light emitting diode module of any two adjacent rows are arranged in a different manner.

2. The light source of claim 1, wherein the light emitting diodes are selected from the group consisting of red light emitting diodes, blue light emitting diodes, green light emitting diodes, magenta light emitting diodes, orange light emitting diodes, yellow light emitting diodes, and cyan light emitting diodes.

3. The light source of claim 1, wherein the light emitting diodes of each light emitting diode module are arranged in a manner of a straight line.

4. The light source of claim 3, wherein the light emitting diode modules of each column comprise a rotation, wherein any two of the light emitting diode modules comprises an included angle therein between.

5. The light source of claim 4, wherein the included angle comprises a right angle, an acute angle, or an obtuse angle.

6. The light source of claim 5, wherein the acute angle comprises a range between 15 degrees to 75 degrees.

7. The light source of claim 5, wherein the acute angle comprises a range between 30 degrees to 60 degrees.

8. The light source of claim 5, wherein the acute angle is 45 degrees.

9. The light source of claim 5, wherein the obtuse angle comprises a range between 105 degrees to 165 degrees.

10. The light source of claim 5, wherein the obtuse angle comprises a range between 120 degrees to 150 degrees.

11. The light source of claim 5, wherein the obtuse angle is 135 degrees.

12. The light source of claim 4, wherein the rotation of the light emitting diode modules of each column comprises a clockwise rotation or a counterclockwise rotation.

13. The light source of claim 3, wherein the light emitting diode modules of each row comprise a rotation, wherein any two of the light emitting diode modules comprises an included angle therein between.

14. The light source of claim 13, wherein the included angle comprises a right angle, an acute angle, or an obtuse angle.

15. The light source of claim 14, wherein the acute angle comprises a range between 15 degrees to 75 degrees.

16. The light source of claim 14, wherein the acute angle comprises a range between 30 degrees to 60 degrees.

17. The light source of claim 14, wherein the acute angle is 45 degrees.

18. The light source of claim 14, wherein the obtuse angle comprises a range between 105 degrees to 165 degrees.

19. The light source of claim 14, wherein the obtuse angle comprises a range between 120 degrees to 150 degrees.

20. The light source of claim 14, wherein the obtuse angle is 135 degrees.

21. The light source of claim 13, wherein the rotation of the light emitting diode modules of each column comprises a clockwise rotation or a counterclockwise rotation.

22. The light source of claim 1, wherein the light emitting diode modules of each column and the light emitting diode modules of each row are arranged corresponding to an alternating manner.

23. The light source of claim 22, wherein any three of the adjacent light emitting diode modules are arranged corresponding to a triangle.

24. A light source, for a backlight unit, the light source comprising:
a plurality of light emitting diode modules arranged in a manner corresponding to an array, wherein each light emitting diode module comprises a plurality of light emitting diodes arranged in a manner of a straight line and in a same order, the array comprises a plurality of columns and rows, and the light emitting diodes of the light emitting diode module of any two adjacent columns are arranged in a different manner, and the light emitting diodes of the light emitting diode module of any two adjacent rows are arranged in a different manner.

25. The light source of claim 24, wherein the light emitting diodes are selected from the group consisting of red light emitting diodes, blue light emitting diodes, green light emitting diodes, magenta light emitting diodes, orange light emitting diodes, yellow light emitting diodes, and cyan light emitting diodes.

26. The light source of claim 24, wherein the light emitting diode modules of each column comprise a rotation, wherein any two of the light emitting diode modules comprises an included angle therein between.

27. The light source of claim 26, wherein the included angle comprises a right angle, an acute angle, or an obtuse angle.

28. The light source of claim 27, wherein the acute angle comprises a range between 15 degrees to 75 degrees.

29. The light source of claim 27, wherein the acute angle comprises a range between 30 degrees to 60 degrees.

30. The light source of claim 27, wherein the acute angle is 45 degrees.

31. The light source of claim 27, wherein the obtuse angle comprises a range between 105 degrees to 165 degrees.

32. The light source of claim 27, wherein the obtuse angle comprises a range between 120 degrees to 150 degrees.

33. The light source of claim 27, wherein the obtuse angle is 135 degrees.

34. The light source of claim 26, wherein the rotation of the light emitting diode modules of each column comprises a clockwise rotation or a counterclockwise rotation.

35. The light source of claim 24, wherein the light emitting diode modules of each row comprise a rotation, wherein any two of the light emitting diode modules comprises an included angle therein between.

36. The light source of claim 35, wherein the included angle comprises a right angle, an acute angle, or an obtuse angle.

37. The light source of claim 35, wherein the acute angle comprises a range between 15 degrees to 75 degrees.

38. The light source of claim 35, wherein the acute angle comprises a range between 30 degrees to 60 degrees.

39. The light source of claim 35, wherein the acute angle is 45 degrees.

40. The light source of claim 35, wherein the obtuse angle comprises a range between 105 degrees to 165 degrees.

41. The light source of claim 35, wherein the obtuse angle comprises a range between 120 degrees to 150 degrees.

42. The light source of claim 35, wherein the obtuse angle is 135 degrees.

43. The light source of claim 35, wherein the rotation of the light emitting diode modules of each column comprises a clockwise rotation or a counterclockwise rotation.

44. The light source of claim 24, wherein the light emitting diode modules of each column and the light emitting diode modules of each row are arranged corresponding to an alternating manner.

45. The light source of claim 44, wherein any three of the adjacent light emitting diode modules are arranged corresponding to a triangle.

46. The light source of claim 45, wherein the adjacent light emitting diode modules comprise at least one light emitting diode module having light emitting diodes arranged in a direction different from the light emitting diodes of the other two light emitting diode modules.

* * * * *